(12) United States Patent
Burns et al.

(10) Patent No.: US 8,733,202 B2
(45) Date of Patent: May 27, 2014

(54) LINEAR LEVEL FOR STEERING COLUMN

(75) Inventors: Kevin M. Burns, Montrose, MI (US); Melvin L. Tinnin, Clio, MI (US); John Schulz, Hemlock, MI (US); Michael P. Anspaugh, Bay City, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 190 days.

(21) Appl. No.: 13/288,377

(22) Filed: Nov. 3, 2011

(65) Prior Publication Data
US 2013/0112032 A1 May 9, 2013

(51) Int. Cl.
*B62D 1/16* (2006.01)
*B62D 1/18* (2006.01)
*B62D 1/20* (2006.01)

(52) U.S. Cl.
USPC .................. 74/498; 74/492; 74/493; 280/775

(58) Field of Classification Search
USPC ..................... 74/492–498; 280/775, 776, 779
See application file for complete search history.

(56) References Cited

U.S. PATENT DOCUMENTS

| | | | | |
|---|---|---|---|---|
| 5,377,555 A | * | 1/1995 | Hancock | 74/493 |
| 5,931,501 A | * | 8/1999 | Baumann et al. | 280/775 |
| 6,460,427 B1 | * | 10/2002 | Hedderly | 74/493 |
| 2006/0175821 A1 | * | 8/2006 | Min | 280/775 |
| 2008/0060467 A1 | * | 3/2008 | Manwaring et al. | 74/493 |
| 2008/0229865 A1 | * | 9/2008 | Manwaring et al. | 74/493 |
| 2008/0245176 A1 | * | 10/2008 | Manwaring et al. | 74/493 |
| 2009/0205459 A1 | * | 8/2009 | Olgren | 74/493 |
| 2011/0167948 A1 | * | 7/2011 | Andrearczyk et al. | 74/493 |

* cited by examiner

*Primary Examiner* — Troy Chambers
*Assistant Examiner* — Jake Cook
(74) *Attorney, Agent, or Firm* — Cantor Colburn LLP

(57) ABSTRACT

An adjustment assembly and adjustable steering column including a linearly slidable actuating lever are provided. The actuating lever is slidable between a first position and a second position along a linear travel path. The actuating lever includes an engaging portion which engages a gear assembly. The gear assembly is connected to a clamping mechanism. The clamping mechanism is configured to apply or release a clamping force on a steering column or other component. Movement of the actuating lever between the first and second positions causes rotation of the gear assembly. Rotation of the gear assembly causes the clamping mechanism to apply or release the clamping force, depending on the direction of rotation. The adjustment assembly also includes a rake bracket to support a compression bracket. The compression bracket supports the component or steering column.

12 Claims, 4 Drawing Sheets

LINEAR LEVEL FOR STEERING COLUMN

BACKGROUND OF THE INVENTION

The following description relates to an adjustment assembly, and more specifically, an adjustment assembly having a linearly moveable actuating lever that is moveable along a linear travel path between a first position to lock the adjustment assembly and a second position to unlock the adjustment assembly.

An adjustment assembly, for example, an adjustment assembly used in conjunction with an adjustable steering column, may typically include a lever that is rotatable between two positions by a user. With the lever in a first position, a steering column is locked in a desired position. In the first, locked, position, at least one locking mechanism fixes a steering column in a tilt direction and a longitudinal direction. With the lever in a second position, the at least one locking mechanism is unlocked and the steering column may be adjusted in the tilt direction and longitudinal direction. Rotating the lever from the first position to the second position releases the at least one locking mechanism from a locking engagement and allows the steering column to be adjusted.

The lever should be of a length sufficient for a user to comfortably apply a force sufficient to rotate the lever between the two positions. However, in order to provide a sufficient level of comfort and ease of use, the lever may need to have a length that is cumbersome or intrusive to a user in a vehicle when the lever is not in use.

In addition, a rotational path of a rotational lever may cover a large amount of space. As a result, various modification may need to be made to nearby panels or other structures to create a sufficient clearance to accommodate a swinging motion of the lever.

A shorter rotation lever may be provided. However, by shortening the length of the lever, the user is required to apply a greater force to rotate the lever between the first and second positions. Thus, providing a shorter lever is not convenient to the user.

Accordingly, it is desirable to reduce the length of the lever while still allowing for comfortable actuation of the lever by the user to move the lever between the first position where the steering column is locked and a second position where the steering column is unlocked and adjustable.

SUMMARY OF THE INVENTION

In one general aspect, there is provided an adjustment assembly including a compression bracket configured to support a component, a rake bracket configured to support the compression bracket and a clamping mechanism configured to apply or release a clamping force on the component. The adjustment assembly also includes an actuating lever slidably attached to the compression bracket and moveable between a first position where the clamping mechanism applies the clamping force on the component and a second position where the clamping force is released from the component, the actuating lever having an engaging portion, and a gear assembly engaged with the engaging portion of the actuating lever and connected to the clamping mechanism. Movement of the actuating lever from the first position to the second position causes the clamping mechanism to release the clamping force, and movement of the actuating lever from the second position to the first position causes the clamping mechanism to apply the clamping force due to the engagement between the engaging portion of the actuating lever and the gear assembly and a connection between the gear assembly and the clamping mechanism.

In another general aspect, there is provided an adjustable steering column including a steering column, a compression bracket configured to support the steering column, a rake bracket configured to support the compression bracket and a clamping mechanism configured to apply or release a clamping force on the steering column. The adjustable steering column also includes an actuating lever slidably attached to the compression bracket and moveable between a first position where the clamping mechanism applies the clamping force on the steering column to lock the steering column in a desired position and a second position where the clamping force is released from the steering column so that the steering column may be adjusted, the actuating lever having an engaging portion, and a gear assembly engaged with the engaging portion of the actuating lever and connected to the clamping mechanism. Movement of the actuating lever from the first position to the second position causes the clamping mechanism to release the clamping force, and movement of the actuating lever from the second position to the first position causes the clamping mechanism to apply the clamping force due to the engagement between the engaging portion of the actuating lever and the gear assembly and a connection between the gear assembly and the clamping mechanism.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
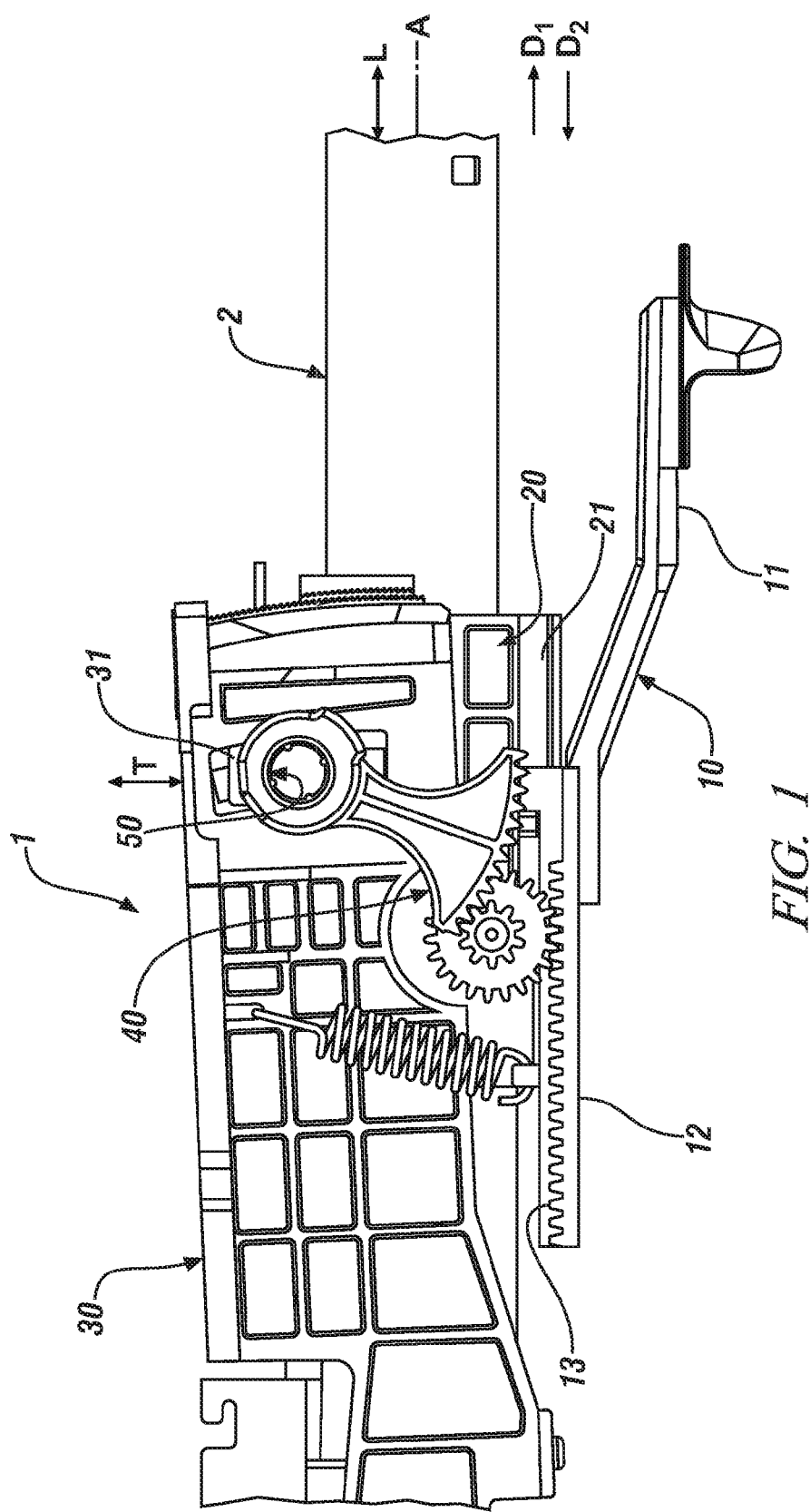
FIG. 1 illustrates a side view of an adjustment assembly in a locked position, according to one aspect of the invention.

Referring now to the Figures, where the invention will be described with reference to specific embodiments, without limiting the same, FIG. 1 illustrates an example of an adjustment assembly 1 operable to lock a component 2 against adjustment, or unlock a component to allow adjustment. In one example, the component 2 may be a steering column. For the purposes of illustration, the following description and figures refer to a steering column as being the component. However, it is understood that the adjustment assembly 1 may be used in conjunction with other components, for example with an adjustable seat, a hood release or a parking brake release. The adjustment assembly includes a linearly slidable actuating lever 10, a compression bracket 20, a rake bracket 30, a gear assembly 40, and clamping mechanism 50.

Figure 2:
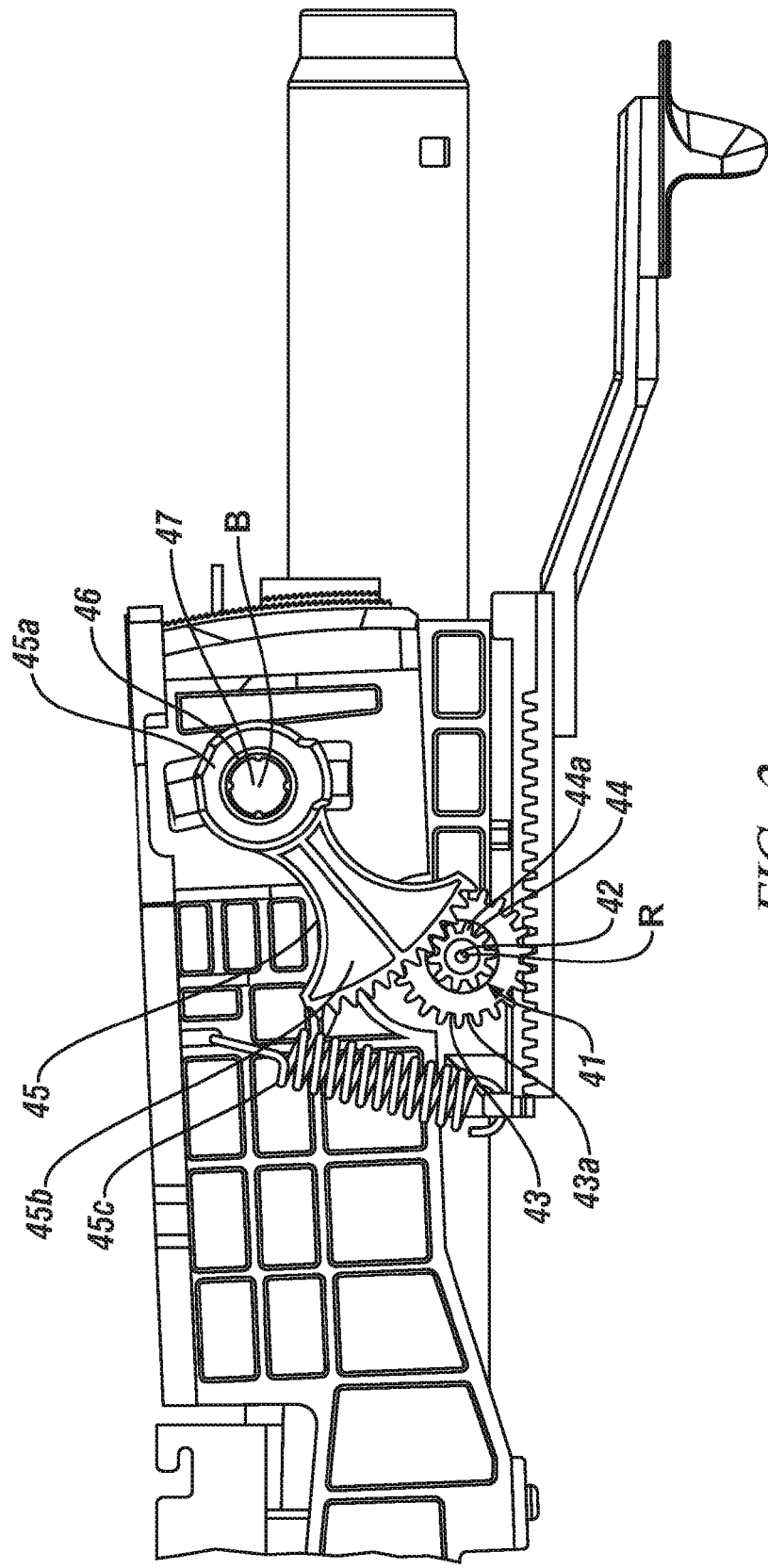
FIG. 2 illustrates a side view of the adjustment assembly of FIG. 1 in an unlocked position, according to another aspect of the invention.
Figure 3:
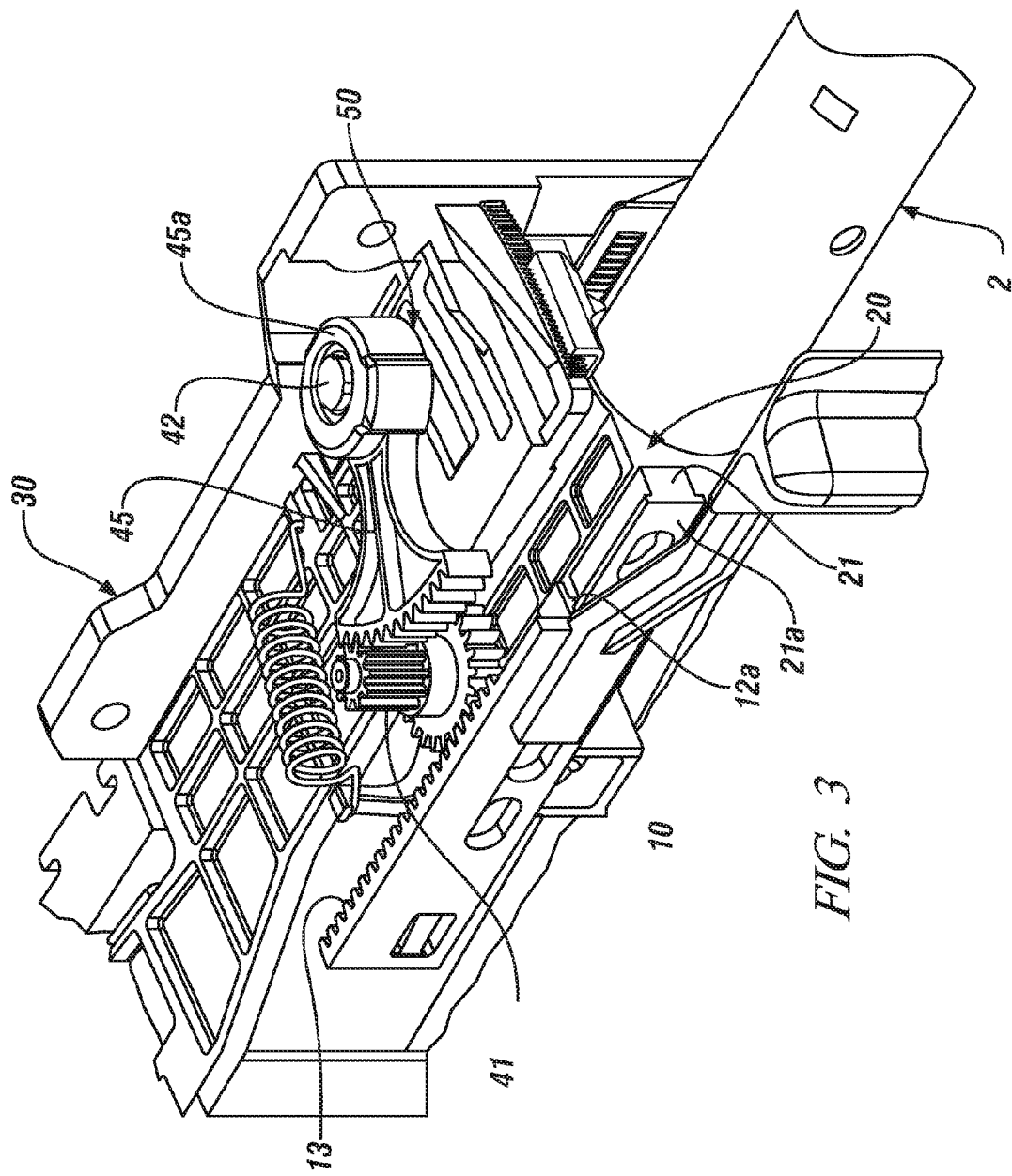
FIG. 3 is a perspective view of the adjustment assembly of FIG. 1, according to yet another aspect of the invention.

In one embodiment, the component 2 is a steering column. As shown in FIGS. 1-3, the steering column 2 extends in a longitudinal direction and defines a longitudinal axis 'A'. One end of the steering column 2 is connected to a steering wheel (not shown) to be operated by a user to steer the vehicle. Another end of the steering column is fixed to a steering mechanism (not shown) to transfer a rotational motion applied by the user on the steering wheel to the steering mechanism. The steering column 2 is adjustable in a tilt direction 'T' and a longitudinal direction 'L,' such that the position of the steering column may be adjusted to a position desired by the operator of the vehicle.

With reference to FIGS. 1 and 2, the actuating lever 10 is slidable by a user in a linear direction, in a push-pull fashion, between a first position where the adjustment assembly 1 is locked and a second position where the adjustment assembly 1 is unlocked. The linear movement of the actuating lever 10 may be along a travel path that is generally parallel to a longitudinal axis 'A' of the steering column 2, as indicated by direction arrows 'D1' and 'D2' shown in FIG. 1. However, the travel path may extend in a direction other than generally parallel to the longitudinal axis 'A'. In the illustrated embodiment, when the actuating lever 10 is in a retracted position as shown in FIG. 1, the adjustment assembly 1 may lock a steering column 2 in a desired position. When the adjustment assembly is in the locked state, adjustment of the steering column is limited or prevented, both in a tilt direction and a longitudinal direction (i.e., along the axis 'A'). When the actuating lever 10 is moved to the second position (see FIG. 2), in the direction of 'D1,' the adjustment assembly is unlocked, and thus, adjustment of the steering column in the tilt and longitudinal directions is allowed.

With the adjustment assembly 1 in the unlocked state and the actuating lever 10 in the second position, the actuating lever 10 may be moved in an opposite direction, 'D2,' to return the operating lever to the first position where the adjustment assembly 1 is locked.

In the illustrated embodiment in FIGS. 1 and 2, unlocking of the adjustment assembly 1 is achieved through an outward sliding movement of the actuating lever 10 in the direction 'D1.' Locking of the adjustment assembly 1 is achieved by sliding the actuating lever 10 inward in the direction 'D2.' However, this particular arrangement is shown for the purposes of example only and is non-limiting. In an alternative embodiment, the adjustment assembly 1 may be configured such that an inward linear movement of the actuating lever 10 in the direction 'D2' unlocks the adjustment assembly, and allows for adjustment of the steering column 2. Accordingly, in this alternative embodiment, an outward linear movement in the direction 'D1' locks the adjustment assembly 1 and prevents or limits adjustment of the steering column 2.

With further reference to FIGS. 1 and 2, the actuating lever 10 includes a first end 11. The first end 11 extends outwardly, i.e., in a rearward direction of a vehicle. The first end 11 is configured to be gripped or otherwise manipulated by a user to move the actuating lever 10 along the linear travel path between the first and second positions.

The actuating lever 10 further includes a second end 12 positioned inwardly, or toward the front of a vehicle, relative to the first end 11. The second end 12 includes an engaging portion 13. With reference to FIGS. 1 and 2, the engaging portion 13, may be, for example, a toothed rack configured to engage the gear assembly 40.

The actuating lever 10 is configured to slide linearly relative to the compression bracket 20. The actuating lever may be slidingly attached to the compression bracket 20 or an intermediate structure positioned between the compression bracket 20 and actuating lever 10. In the embodiment shown in FIGS. 1 and 2, the actuating lever is slidingly attached to the compression bracket 20 along the second end 12 of the actuating lever. In this embodiment, the second end 12 includes a groove 12a formed at least partially along its length. The groove 12a extends in a longitudinal direction substantially parallel to the longitudinal axis 'A' of the steering column 2.

With further reference to FIGS. 1 and 2, the compression bracket 20 includes a rail bracket 21. The rail bracket 21 includes a tongue 21a extending at least partially along the length of the rail bracket 21. The tongue 21a is received in the groove 12a of the actuating lever 10. The actuating lever 10 may slide along the tongue 21a in the directions D1, D2, thereby slidingly attaching the actuating lever 10 to the compression bracket 20 for linear movement relative to the compression bracket 20. The tongue 21a and groove 12a connection allows linear movement of the actuating lever 10 relative to the compression bracket 20 while substantially fixing the actuating lever 10 against movement in other directions.

It is understood the arrangement described above for slidingly attaching the actuating lever 10 to the compression bracket 20 is only one example of how such an attachment may be made. The actuating lever 10 may be attached by any suitable arrangement which allows relative linear movement between the actuating lever 10 and compression bracket 20. For example, an interlocking dovetail arrangement may be provided between the actuating lever 10 and the compression bracket 20. Alternatively, one of the compression bracket 20 and actuating lever 10 may include a projection having a generally circular cross-section extending in a longitudinal direction, and the other of the compression bracket and actuating lever may include a groove shaped to receive the generally circular projection. In addition, the attachment may be made at any suitable position along the actuating lever 10. Further still, a bearing element, such a rolling element or elements may be disposed between the actuating lever 10 and compression bracket 20.

A gear assembly 40 is positioned between the actuating lever 10 and the clamping mechanism 50. The gear assembly 40 connects the actuating lever 10 to the clamping mechanism 50. In the embodiments described herein, the gear assembly 40, at one end, engages the engaging portion 13 of the actuating lever 10. At another end, the gear assembly 40 is connected to the clamping mechanism 50 to move the clamping mechanism 50 between clamped and unclamped positions as described later.

With reference to FIGS. 1-3, one embodiment of the gear assembly 40 includes a stepped gear 41 rotatably mounted to the compression bracket 20. The stepped gear 41 is rotatably mounted to the compression bracket 20 on a stepped gear shaft 42. The stepped gear 41 is generally circular in shape and may be in the form of a spur gear. The stepped gear 41 includes an outer step 43 having outer gear teeth 43a formed along an outer circumference of the outer step 43. The outer gear teeth 43a are configured to mesh with the engaging portion 13 at the second end 12 of the actuating lever 10. When the actuating lever 10 moves linearly in the direction D1 or D2, the meshing engagement of the engaging portion 13 and the outer gear teeth 43a causes the stepped gear 41 to rotate about a rotation axis 'R.'

The stepped gear 41 also includes an inner step 44 having a smaller diameter than the outer step 43. The inner step 44 includes inner gear teeth 44a positioned along its outer circumference. The inner step 44 rotates together with the outer step 43 about the rotation axis 'R.'. In addition, the inner step 44 is axially offset along the rotation axis 'R' from the outer step 43.

The embodiment of the gear assembly 40 shown in FIGS. 1-3 further includes an adjustment arm 45 that is rotatably mounted on the compression bracket 20. The adjustment arm includes a first end 45a and a second end 45b. The first end 45a of the adjustment arm 45 includes an opening 46 configured to receive a tilt adjustment shaft 47 on which the adjustment arm 45 is mounted. The tilt adjustment shaft 47 extends at least partially through compression bracket 20 in a direction transverse to the longitudinal axis 'A' of the steering column 2.

The second end 45b of the adjustment arm 45 includes gear teeth forming a gear profile 45c. The gear profile 45c of the adjustment arm 45 meshes with the inner gear teeth 44a of the inner step 44 of the stepped gear 41. Thus, in the embodiment described above, a rotation of the stepped gear 41 caused by linear movement of the actuating lever 10, causes a rotation of the adjustment arm 45 by way of the gear profile 45c of the adjustment arm 45 meshing with the inner gear teeth 44a of the inner step 44.

It is understood that the description of the gear assembly above and shown in the figures is only one example of a suitable gear assembly. Other gear assemblies may be implemented which transfer a force supplied from a linearly slidable lever in such way to cause an adjustment arm or other similar component to rotate about an axis. For example, a gear assembly including multiple rotating gears or separate gears instead of the step gear described above may be implemented as well. More specifically, the step gear may be replaced with two rotating gears meshingly engaged with other. In this configuration, one rotating gear has a larger diameter than another rotating gear. Sliding movement of the actuating lever causes a first rotating gear to rotate. The second rotating gear, engaged with the first rotating gear, is then caused to rotate. The second rotating gear may engage the adjustment arm 45 and cause rotation of the adjustment arm in a fashion similar to that described above.

Figure 4:
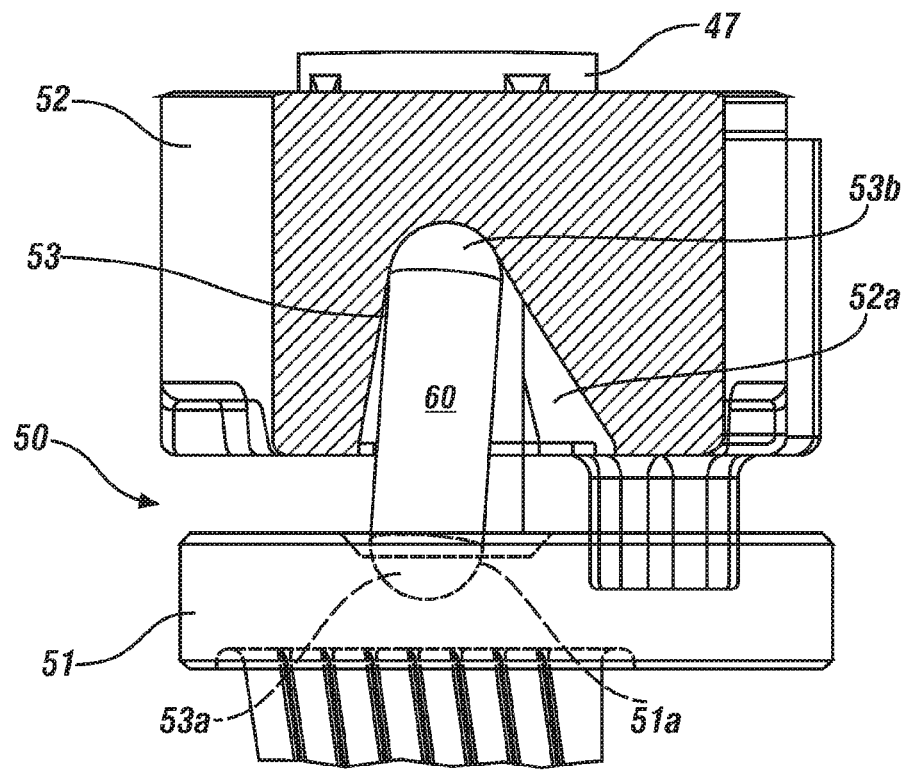
FIG. 4 illustrates an example of a clamping mechanism in a position corresponding to the adjustment assembly being locked according to still yet another aspect of the invention.
Figure 5:
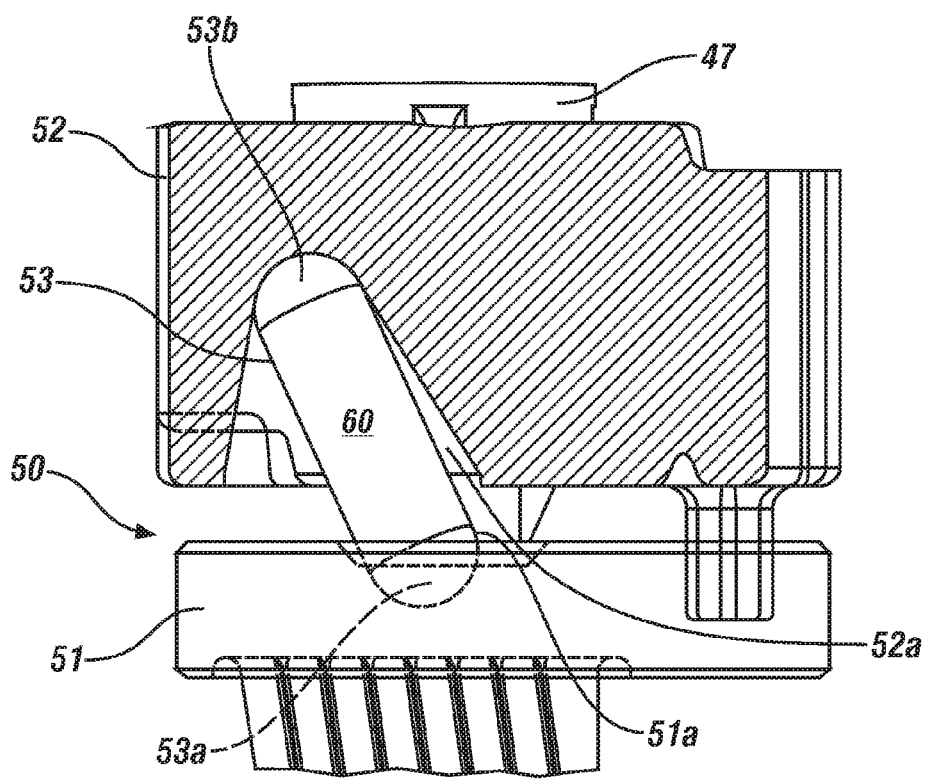
FIG. 5 illustrates an example of the clamping mechanism in a position corresponding to the adjustment assembly being unlocked according to yet still another aspect of the invention.

The clamping mechanism 50 is attached to at least a portion of the gear assembly 40 and is operated by the gear assembly. In one embodiment, as shown in FIGS. 4 and 5, the clamping mechanism 50 may be a cam assembly. In the example shown, the cam assembly includes a first cam plate 51 and second cam plate 52. The second cam plate 52 is connected to the adjustment arm 45 such that rotation of the adjustment arm 45 causes the second cam plate 52 to rotate. In one non-limiting embodiment, the second cam plate 52 is overmolded to the adjustment arm 45 to rotate therewith. Other suitable connections which allow the second cam plate 52 to rotate with the adjustment arm 45 may be used as well.

With reference to FIG. 4, the first cam plate 51 and second cam plate 52 are positioned about the tilt adjustment shaft 47, with the tilt adjustment shaft extending through an opening in each of the first cam plate 51 and second cam plate 52.

The cam assembly 50 may be a pin type cam. As shown in FIG. 4, the cam assembly may be a 2-pin cam assembly. However, other suitable cam assemblies may be implemented as well, for example, a 3-pin cam assembly.

In the pin type cam, pins 53 are movably positioned in recesses 51a, 52a in the first cam plate 51 and second cam plate 52. The pins 53 include a first end 53a received in respective recesses 51a of the first cam plate 51 and a second end 53b received in respective recesses 52a of the second cam plate 52. As shown in FIGS. 4 and 5, the respective recesses 52a of the second cam plate 52 include a ramped portion. The second end 53a of the respective pins 53 may selectively slide about in the respective ramped recesses 52a.

Referring now to FIGS. 1-5, as a user selectively exerts a force on the actuating lever 10 to linearly slide the actuating lever 10 in either direction D1 or D2, the adjustment arm 45 is caused to rotate via rotation of the stepped gear 41. The rotation of the adjustment arm 45 causes the second cam plate 52 to rotate about an axis of rotation 'B' while the first cam plate 51 remains rotationally fixed. The rotation of the second cam plate 52 causes the second end 53b of the respective pins 53 to slide within the respective ramped recesses 52b.

Depending on the direction of rotation of the second cam plate 52, each pin 53 either moves toward a direction where the pin is generally parallel to the axis of rotation 'B' (generally vertical in FIG. 4) or away from a position where each pin is generally parallel to the axis of rotation 'B' (FIG. 5). With reference to FIGS. 4 and 5, as the pins move toward a position where they are generally parallel to the axis of rotation 'B,' the pins 53 push the first cam plate 51, which is fixed against rotation, axially inward along the axis of rotation B. That is, as the pins 53 are moved to a position that is generally parallel to the axis of rotation 'B,' the pins act to push the first cam plate 51 in an axial direction along the axis of rotation inward toward the steering column 2. This inward movement of the first cam plate 51 applies a clamping force to the rake bracket 30 and compression bracket 20, which, in turn, clamps or locks the steering column 2 in a desired position.

Conversely, rotation of second cam plate 52 in the opposite direction, such that the pins 53 move away from a position where they are parallel with the axis of rotation 'B,' allows the first cam plate 51 to move toward second cam plate 52 along the axis of rotation. This axial movement releases a clamping force applied to the compression bracket 20 and steering column 2, thereby unlocking the steering column and allowing adjustment thereof.

The adjustment assembly 1 also includes the rake bracket 30. The rake bracket 30 is fixed to a portion of the vehicle and supports the actuating lever 10, compression bracket 20, gear assembly 40, clamping mechanism 50 and the steering column 2.

As shown in the embodiment illustrated in FIGS. 1-3, the rake bracket 30 includes a rake adjustment slot 31, which is generally vertical or arcuate, and allows for adjustment of the steering column in the rake or tilt direction 'T.' The rake adjustment shaft 47 extends through the rake adjustment slot 31 and is moveable therein to adjust the rake or tilt position of the steering column when the adjustment assembly 1 is unlocked.

With reference to FIGS. 1 and 2, an operation of an exemplary embodiment of the adjustment assembly is described below. The adjustment assembly 1 may initially be in a fixed or locked position. To adjust the steering column, the user applies a force to move the actuating lever 10 along a linear travel path by gripping or otherwise manipulating the first end 11 of the actuating lever 10. In this embodiment, the actuating lever 10 is slidable in a direction linearly outward from the steering assembly D1, i.e., toward the rear of the vehicle. The second end 12 of the actuating lever 10 is slidable along the rail bracket 21 such that the actuating lever 10 moves linearly outward in the direction D1.

While the actuating lever 10 is moved between positions, the engaging portion 13 engages the gear assembly 40 and transmits a force thereto. In the illustrated embodiment, the engaging portion 13 is a toothed rack positioned along the second end 12 of the actuating lever. Here, the toothed rack meshes with a gear in the gear assembly 40 to transmit the force thereto.

The gear assembly 40 includes the stepped gear 41 rotatably mounted on the stepped gear shaft 42. The stepped gear 41 includes the outer step 43 having outer gear teeth 43a formed thereon and the inner step 44 having inner gear teeth 44a formed thereon. In this embodiment, the toothed rack meshes with the outer gear teeth 43a of the stepped gear 41 causing the stepped gear 41 to rotate on the stepped gear shaft 42.

Also in this embodiment, the inner gear teeth 44a of the inner step 44 mesh with the gear profile 45c of the adjustment arm 45. The meshed engagement of the inner gear teeth 44a and the gear profile 45c causes the adjustment arm 45 to rotate. For example, from the perspective shown in FIGS. 1 and 2, the adjustment arm 45 rotates in a clockwise direction when moving between the position shown in FIG. 1 and the position shown in FIG. 2.

It is understood that the directions of rotation described above and shown in figures are provided for the purposes of example only. The direction of rotation may change depending on the relative position of various components and different configurations of the gear assembly. For example, in the alternative embodiment where the stepped gear may be replaced to with two gears which meshingly engage along a portion of their respective peripheries, the direction of rotation of the adjustment arm 45 will be in a direction opposite to that shown in example of FIGS. 1-3. In this arrangement, the clamping mechanism 50 may be modified accordingly to account for the different direction of rotation of the adjustment arm 45.

In the exemplary embodiment shown in FIGS. 1 and 2, as the actuating lever 10 is moved linearly outwardly, the gear assembly 40 acts on the clamping mechanism 50 to release the clamping force applied to the rake bracket 30, compression bracket 20 and steering column 2. That is, in the exemplary embodiment above, the adjustment arm 45 rotates during movement of the actuating lever 10 from the first position to the second position to unlock the adjustment assembly. The adjustment arm 45 is connected to the clamping mechanism 50 such that rotation of the adjustment arm 45 causes the clamping mechanism 50 to release the clamping force.

In the exemplary embodiment above, and with further reference to FIGS. 4 and 5, the clamping mechanism 50 may be a cam assembly including the first and second cam plates 51, 52. In this example, rotation of the adjustment arm 45 causes the second cam plate 52 of the cam assembly 50 to rotate. Rotation of the second cam plate 52 relative to the first cam plate 51 causes the pins 53 to slide with respective ramped recesses 52a and move to a position away from being generally parallel to the axis of rotation 'B.' Because the pins are moved away from a position that is generally parallel to axis of rotation 'B,' the pins occupy a shorter axial distance. As a result, the first cam plate 51 moves axially along the axis of rotation toward the second cam plate 52, and generally away from the steering column. This outward movement along the axis of rotation releases the clamping pressure applied to the rake bracket 30, compression bracket 20 and steering column 2, thereby unlocking the steering column to be adjusted.

FIG. 2 shows the relative positions of the adjustment arm 45, stepped gear 41, compression bracket 20 and actuating lever 10 when the adjustment assembly 1 is unlocked, according to one of the embodiments described herein. FIG. 5 shows the position of the pins 53 relative to the first and second cam plates 51, 52 when the adjustment assembly is unlocked according to one of the embodiment described herein.

In exemplary embodiment described above, to adjust the position of the steering column, a user may apply a force to move the steering column in the rake or tilt direction. Upon application of force from the user, the adjustment shaft 47 is moved along rake adjustment slot 31 of the rake bracket 30 during such an adjustment. To adjust the longitudinal position of the steering column 2, a user may apply a force along the longitudinal axis 'A' of the steering column 2.

When the steering column 2 has been adjusted to a desired position, the user may apply in inward force (in direction D2 as shown in FIG. 1), i.e., toward the front of the vehicle, to the first end 11 of the actuating lever 10 to cause an inward linear movement of the actuating lever 10. During this inward movement, the engaging portion 13, for example, a toothed rack of the second end 12 of the linear lever arm 10, causes the gear assembly to act on the clamping mechanism 50 such that the clamping mechanism applies a clamping force to the steering column 2, compression bracket 30 and rack bracket 40.

With reference to the examples described above and FIGS. 1-3, the stepped gear 41 is rotated in an opposite direction due to the engagement with the engagement portion 13 of the actuating lever 10 during inward movement of the actuating lever 10. That is, inward movement of the actuating lever 10, in the illustrated embodiment, causes the stepped gear 41 to rotate in a direction opposite to the direction the stepped gear 41 rotates during unlocking of the adjustment assembly 1.

With further reference to the embodiment shown in FIGS. 1-3, the inner gear teeth 44a of the inner step 44 mesh with the gear profile of the 45c of the adjustment arm 45 to rotate the adjustment arm 45 about the axis of rotation 'B.' With reference to FIGS. 4 and 5, the rotation of the adjustment arm 45 causes the second cam plate 52 to rotate in a direction opposite to the direction of rotation during unlocking of the adjustment assembly. Rotation of the second cam plate 52 moves the pins 53 to a position where the pins 53 are generally parallel with the axis of rotation 'B' (FIG. 5). In this position, the pins occupy a greater axial extent along the axis of rotation 'B' than they do when they are not generally parallel to the axis 'B.' Thus, movement of the pins 53 to the generally parallel position described above causes the pins 53 to push the first cam plate 51 axially away from the second cam plate 52, and inward generally toward the steering column 2. The inward movement of the first cam plate 51 applies a clamping force to the rake bracket 30, compression bracket 20 and steering column 2. When sufficient clamping force is applied, relative movement between the steering column 2, compression bracket 20 and rake bracket 30 is limited or prevented, thereby locking the steering column 2 in the desired position.

FIGS. 1 and 2 illustrate an embodiment where the actuating lever 10 acts on one side of the adjustment assembly 1 to lock or unlock the steering column. In another embodiment, the actuating lever 10 may act on both sides of the adjustment assembly 1 to lock or unlock the steering column for adjustment. That is, in another embodiment, an arrangement of components similar to those shown in FIGS. 1 and 2 may be provided on both lateral sides of the adjustment assembly 1.

Specifically, on a side of the adjustment assembly 1 opposite to the side shown in FIGS. 1 and 2, the actuating lever 10 may include a second engagement portion which meshes with a second gear assembly. The second gear assembly acts on a second clamping mechanism to apply or release a clamping force on the rake bracket 30, compression bracket 20 and steering column 1. The application or release of clamping force may be performed in a manner similar to that described in the embodiments above.

A mechanical advantage may be produced in the embodiments described herein due to the gear ratios and relative positions of the engaging portion, stepped gear 41, outer step 43, inner step 44, and gear profile 45c of the adjustment arm 45. Thus, an input force required for a user to actuate the linear actuating lever may be reduced. Further, by using a lever that is linearly moveable when operated by a user, rather than rotating lever, a length and travel path of a lever may be decreased.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment assembly comprising:
a compression bracket configured to support a component, the compression bracket including a rail bracket having a tongue extending at least partially along a length of the rail bracket;
a rake bracket configured to support the compression bracket;
a compression mechanism configured to apply or release a clamping force on the component;
an actuating lever slidably attached to the compression bracket and moveable between a first position where the compression mechanism applies the clamping force on the component and a second position where the clamping force is released from the component, the actuating lever having an engaging portion and a groove formed at least partially along a length of the actuating lever, wherein the groove receives the tongue such that the actuating lever is moveable along a linear travel path between the first position and the second position; and
a gear assembly engaged with the engaging portion of the actuating lever and connected to the compression mechanism.

2. The adjustment assembly of claim 1, wherein the engagement portion of the actuating lever is a toothed rack configured to mesh with the gear assembly.

3. The adjustment assembly of claim 2, wherein the gear assembly includes a stepped gear having an inner step and an outer step, the outer step configured to mesh with the engagement portion of the actuating lever.

4. The adjustment assembly of claim 3, wherein the gear assembly further comprises an adjustment arm having a first end rotatably mounted relative to the compression bracket and a second end presenting a gear profile meshing with the inner step of the stepped gear.

5. The adjustment assembly of claim 4, wherein the compression mechanism is connected to the first end of the of the adjustment arm such that rotation of the adjustment arm causes the compression mechanism to apply or release the clamping force.

6. An adjustable steering column comprising:
a steering column;
a compression bracket configured to support the steering column;
a rake bracket configured to support the compression bracket;
a compression mechanism configured to apply or release a clamping force on the steering column, the compression mechanism including a first cam plate operatively associated with a second cam plate, and a pin oriented between the first and second cam plates, the first cam plate including a recess to receive a first end of the pin, and the second cam plate including a recess to receive a second end of the pin;
an actuating lever slidably attached to the compression bracket and moveable between a first position where the compression mechanism applies the clamping force on the steering column to lock the steering column in a desired position and a second position where the clamping force is released from the steering column so that the steering column may be adjusted, the actuating lever having an engaging portion, the actuating lever moveable along a linear travel path between the first position and the second position; and
a gear assembly engaged with the engaging portion of the actuating lever and connected to the compression mechanism, the gear assembly including an adjustment arm having a first end and a second end, the first end rotatably mounted on the compression bracket, and at least a portion of the first end comprises the first cam plate.

7. The adjustable steering column of claim 6, wherein the engagement portion of the actuating lever is a toothed rack configured to mesh with the gear assembly.

8. The adjustable steering column of claim 7, wherein the gear assembly includes a stepped gear having an inner step and an outer step, the outer step configured to mesh with the engagement portion of the actuating lever, and the adjustment arm second end includes a gear profile meshing with the inner step of the stepped gear.

9. The adjustable steering column of claim 8, wherein the compression mechanism is connected to the first end of the of the adjustment arm such that rotation of the adjustment arm causes the compression mechanism to apply or release the clamping force.

10. The adjustable steering column of claim 6, wherein the first cam plate recess and the second cam plate recess are ramped.

11. The adjustable steering column of claim 10, wherein the first cam plate is fixed against rotation and the second cam plate rotates about a rotational axis between a first orientation and a second orientation where the second cam plate is closer to the first cam plate than in the first orientation.

12. The adjustable steering column of claim 11, wherein in the first orientation the pin is generally parallel to the rotational axis of the second cam plate.

* * * * *